(12) United States Patent
Takaoka et al.

(10) Patent No.: US 10,769,041 B2
(45) Date of Patent: Sep. 8, 2020

(54) INFORMATION PROCESSING SYSTEM, MONITORING APPARATUS, AND NETWORK DEVICE

(71) Applicant: FUJITSU LIMITED, Kawasaki-shi, Kanagawa (JP)

(72) Inventors: Masanori Takaoka, Kawasaki (JP); Naoyoshi Toshine, Kawasaki (JP); Yuya Ikuta, Machida (JP); Junichi Murakami, Yokohama (JP); Hideki Nagatomo, Yokohama (JP); Sei Murata, Kawasaki (JP); Akihide Otawa, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/031,460

(22) Filed: Jul. 10, 2018

(65) Prior Publication Data

US 2019/0018743 A1      Jan. 17, 2019

(30) Foreign Application Priority Data

Jul. 12, 2017  (JP) ................. 2017-136204

(51) Int. Cl.
*G06F 11/20* (2006.01)
*G06F 3/06* (2006.01)
(Continued)

(52) U.S. Cl.
CPC ............ *G06F 11/201* (2013.01); *G06F 3/067* (2013.01); *G06F 3/0611* (2013.01);
(Continued)

(58) Field of Classification Search
CPC .... G06F 3/0611; G06F 3/0635; G06F 3/0653; G06F 3/067; G06F 11/201;
(Continued)

(56) References Cited

U.S. PATENT DOCUMENTS

| | | | | |
|---|---|---|---|---|
| 6,195,703 | B1 * | 2/2001 | Blumenau | ............... G06F 9/505 |
| | | | | 709/211 |
| 6,438,595 | B1 * | 8/2002 | Blumenau | ............. G06F 9/5083 |
| | | | | 709/226 |

(Continued)

FOREIGN PATENT DOCUMENTS

| | | |
|---|---|---|
| JP | 2000-151674 | 5/2000 |
| JP | 2005-51335 | 2/2005 |
| JP | 2006-79378 | 3/2006 |

*Primary Examiner* — Nimesh G Patel
(74) *Attorney, Agent, or Firm* — Staas & Halsey LLP

(57) ABSTRACT

Each information processing apparatus judges a busy flag of a first port thereof based on a result of comparison of a busy level of the first port and a busy level of a second port of another information processing apparatus. A monitoring apparatus determines from among the information processing apparatuses, a first information processing apparatus and a second information processing apparatus, based on the results of judgment by the information processing apparatuses. An L2 switch changes to the second information processing apparatus, a destination of a frame whose destination is the first information processing apparatus and changes to the first information processing apparatus, a transmission source of the frame whose transmission source is the second information processing apparatus.

6 Claims, 15 Drawing Sheets

(51) Int. Cl.
*G06F 11/30* (2006.01)
*G06F 11/07* (2006.01)

(52) U.S. Cl.
CPC .......... *G06F 3/0635* (2013.01); *G06F 3/0653* (2013.01); *G06F 11/079* (2013.01); *G06F 11/0727* (2013.01); *G06F 11/0751* (2013.01); *G06F 11/301* (2013.01)

(58) Field of Classification Search
CPC ............. G06F 11/0727; G06F 11/0751; G06F 11/079; G06F 11/301
See application file for complete search history.

(56) References Cited

U.S. PATENT DOCUMENTS

| | | |
|---|---|---|
| 9,747,040 B1 * | 8/2017 | Balakrishnan ........ G06F 3/0611 |
| 2002/0007359 A1 * | 1/2002 | Nguyen ................ G06F 16/972 |
| 2005/0025045 A1 | 2/2005 | Shimozono et al. |
| 2006/0056293 A1 | 3/2006 | Kumagai et al. |
| 2011/0314164 A1 * | 12/2011 | Alatorre ............. H04L 41/0816 |
| | | 709/227 |
| 2016/0092136 A1 * | 3/2016 | Balakrishnan ........ G06F 3/0635 |
| | | 710/38 |

* cited by examiner

FIG.8

| BUSY FLAG | BUSY STATE | PROCESS | |
|---|---|---|---|
| ON | BUSY STATE OFF | TRANSITION TO BUSY PROCESS AFTER CHANGING BUSY STATE TO ON | ~801 |
| ON | BUSY STATE ON | TRANSITION TO BUSY PROCESS | ~802 |
| OFF | BUSY STATE OFF | NO PROCESS | ~803 |
| OFF | BUSY STATE ON | END BUSY PROCESS AFTER CHANGING BUSY STATE TO OFF | ~804 |

| ACCESS TYPE | PRESENCE/ABSENCE OF DATA IN STORAGE NOT IN BUSY STATE | PROCESS |
|---|---|---|
| READ REQUEST | YES | FRAME TRANSFER CONTROL USING MIB VALUE |
| READ REQUEST | NO | RELOCATION INSTRUCTION TO STORAGES FOLLOWED BY FRAME TRANSFER CONTROL USING MIB VALUE |
| WRITE REQUEST | - | FRAME TRANSFER CONTROL USING MIB VALUE |

INFORMATION PROCESSING SYSTEM, MONITORING APPARATUS, AND NETWORK DEVICE

CROSS REFERENCE TO RELATED APPLICATIONS

This application is based upon and claims the benefit of priority of the prior Japanese Patent Application No. 2017-136204, filed on Jul. 12, 2017, the entire contents of which are incorporated herein by reference.

FIELD

Embodiments discussed herein are related to an information processing system, a monitoring apparatus, and a network device.

BACKGROUND

Conventionally, with a so-called breakout cable, at one end of a cable is a connector capable of transferring data at a certain maximum transfer rate while at the other end of the cable are plural connectors each capable of transferring data at a transfer rate that is a fraction of the certain maximum transfer rate. For example, a single port of a network device may be connected with respective ports of plural information processing apparatuses by using a breakout cable.

According to a related prior art, for example, a switch between a computer and a storage apparatus manages relayed commands, and when detecting an obstacle, the switch concurrently transmits an error response to the computer and changes configuration so that subsequent commands are relayed along an alternate route. According to a further technique that is a Media Access Control (MAC) address table control method of a switching hub apparatus, a MAC address table is controlled according to a link state of an external apparatus connected to the switching hub apparatus. According to another technique, based on load information that indicates the load of each port allocated to targets that manage initiator commands from an external apparatus connected to a network, an instruction is given to change the allocation of the ports for the targets so that the load of ports becomes distributed. For examples of such techniques, refer to Japanese Laid-Open Patent Publication No. 2005-051335, Japanese Laid-Open Patent Publication No. 2000-151674, and Japanese Laid-Open Patent Publication No. 2006-079378.

SUMMARY

According to an aspect of an embodiment, an information processing system includes a plurality of information processing apparatuses having ports that input and output data; a monitoring apparatus connected to each of the plurality of information processing apparatuses; and a network device connected to the monitoring apparatus, the network device further connected by a single port, to a port of the each of the plurality of information processing apparatuses. The each of the plurality of information processing apparatuses judges based on a result of comparison of a first value indicating an extent of delay of a response to a request at the port of the each of the plurality of information processing apparatuses and a second value indicating an extent of delay of a response to the request at a port of another of the plurality of information processing apparatuses, whether response to the request is executable by the port of the each of the plurality of information processing apparatuses. The monitoring apparatus acquires from the each of the plurality of information processing apparatuses, a result of judgment of whether response to the request is executable by the port of the each of the plurality of information processing apparatuses, and based on the acquired result of judgment by the each of the plurality of information processing apparatuses, determines from the plurality of information processing apparatuses, a first information processing apparatus that does not transmit the data and a second information processing apparatus that transmits the data in place of the first information processing apparatus. The network device acquires from the monitoring apparatus, information that identifies the first information processing apparatus and the second information processing apparatus, the network device further changes to the second information processing apparatus, a destination of the data whose destination is the first information processing apparatus and changes to the first information processing apparatus, a transmission source of the data whose transmission source is the second information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram of an example of processes of the monitoring apparatus 203, corresponding to combinations of a monitoring table 722 and a busy flag;

FIG. 9 is a diagram of an example of busy processes;

FIG. 12 is a flowchart of example of a procedure of the busy process for when the busy flag is OFF and the busy state is ON;

DESCRIPTION OF THE INVENTION

First, problems associated with the conventional arts will be discussed. According to the conventional arts, when a breakout cable is used to connect a single port of a network device with the ports of plural information processing apparatuses, if a failure occurs at one of the plural information processing apparatuses, transmission of the data to the other information processing apparatuses may become impossible. In particular, when a failure occurs at a certain information processing apparatus, the certain information processing apparatus becomes unable to receive data, whereby the data that cannot be received accumulates in a buffer of the port of the network device. There is limit on the data that may accumulate in the buffer of the port of the network device and when the number of data that has accumulated in the port buffer reaches this limit, the port cannot accept the data and as a result, the data cannot be transmitted to the other information processing apparatuses.

Embodiments of an information processing system, a monitoring apparatus, and a network device of the disclosure will be described in detail with reference to the accompanying drawings.

Figure 1:
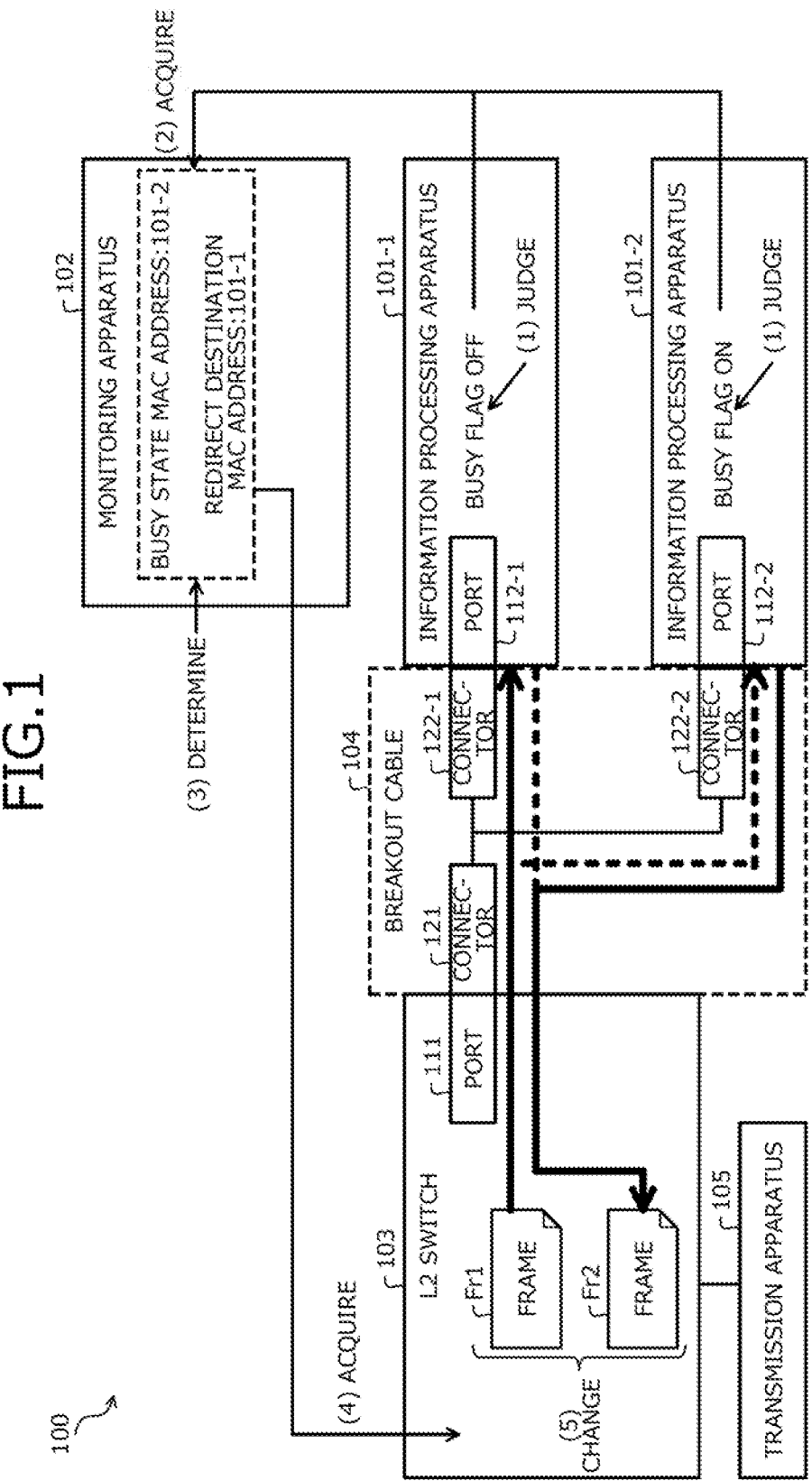
FIG. 1 is a diagram of an example of operation of an information processing system 100 according to an embodiment.

FIG. 1 is a diagram of an example of operation of an information processing system 100 according to an embodiment. The information processing system 100 is a system built by plural information processing apparatuses 101. The information processing apparatuses 101 are, for example, storages. A single virtual storage may be provided by plural storages. Further, the information processing apparatuses 101 are not limited to storage. For example, the information processing apparatuses 101 may be a Web server configured for redundancy, a database (DB) server, etc.

Further, the information processing apparatuses 101 are connected to a network device to communicate with external devices. Here, a maximum transfer rate of a port of the network device may be higher than a maximum transfer rate of the ports of the information processing apparatuses 101. In this case, when the ports of the information processing apparatuses 101 and the ports of the network device are connected on a one-to-one basis, the transfer capability of the ports of the network device are not sufficiently utilized.

Thus, to sufficiently utilize the transfer capability of the ports of the network device, use of a breakout cable to connect a single port of the network device with the ports of the information processing apparatuses 101 is conceivable. As a result, the transfer capability of the network device may be sufficiently utilized. The breakout cable is a cable that has at one end, a connector capable of transferring data at a certain maximum transfer rate and that has at the other end, plural connectors capable of transferring data at a transfer rate that is a fraction of the certain maximum transfer rate. The certain maximum transfer rate may be divided into equal fractions or unequal fractions. A breakout cable may realize enhanced port density.

However, when the described connection method of using a breakout cable is adopted and a failure occurs at one of the information processing apparatuses 101, transmission of the data to the other information processing apparatuses 101 may become impossible In particular, when a fault occurs at a certain one of the information processing apparatuses 101, the certain one of the information processing apparatuses 101 cannot receive data and as a consequence, the data that cannot be received by the certain one of the information processing apparatuses 101 accumulates in a buffer of the port of the network device. Here, there is a limit on the number of data that can accumulate in the buffer of the port of the network device. When the number of data accumulated in the buffer reaches the limit, buffer clogging occurs and the port cannot accept data. As a result, the data cannot be transmitted to the other information processing apparatuses 101. In this manner, when a breakout cable is used commonly between a single port of the network device and the plural information processing apparatuses 101, a problem at a certain one of the information processing apparatuses 101 further affects the other information processing apparatuses 101. In addition, system failure of the information processing apparatuses 101 overall may occur.

When system failure of the information processing apparatuses 101 overall occurs, the following six recovery procedures are performed by, for example, a manager. Further, when the information processing apparatuses 101 are storages and a single virtual storage is built by plural storages, the following eight recovery procedures are performed. A first recovery procedure is identification of the information processing apparatus 101 that caused a problem. A second recovery procedure is confirmation of the ports to which the information processing apparatus 101 is connected. A third recovery procedure is confirmation of the other information processing apparatuses 101 that affect the information processing apparatus 101 that caused the problem. A fourth recovery procedure is a procedure in a case where a problem occurs when a single virtual storage is built. The fourth recovery procedure is deconfiguration of the single virtual storage. A fifth recovery procedure is evacuation of the information processing apparatus 101 that caused a problem. A sixth recovery procedure is restoration of the information processing apparatus 101 that caused the problem. A seventh recovery procedure is rearrangement of the other information processing apparatuses 101 that affect the information processing apparatus 101 that caused the problem. An eighth recovery procedure is a procedure in a case where a single virtual storage is built. The eighth recovery procedure is reconfiguration of the single virtual storage.

The recovery procedures above are procedures for a single breakout cable. Breakout cables are used in large numbers at a data center and since the recovery procedures above are performed for each of the breakout cables, workload of the manager becomes high.

Thus, in the present embodiment, description will be given where each of the information processing apparatuses 101 judges whether the information processing apparatus 101 is busy and based on determination results of the information processing apparatuses 101, the network device changes a destination of a frame to an information processing apparatus 101 that is busy to that of an information processing apparatus 101 that is not busy. Here, busy means that response to request cannot be performed.

With reference to FIG. 1, an example of operation of the information processing system 100 will be described. In FIG. 1, the information processing system 100 includes information processing apparatuses 101-1, 101-2 as the information processing apparatuses 101, a monitoring apparatus 102 as a network device, and an L2 switch 103 as a network device. Further, the L2 switch 103 is connected to a transmission apparatus 105. In the description hereinafter, when elements of a same type are to be distinguished, reference characters will include characters common to each element of the same type and a hyphen followed by a character identifying a specific element among the elements of the same type. For example, "the information processing apparatus 101-1" and "the information processing apparatus 101-2" are used to distinguish elements of the same type and when elements of the same type need not be distinguished, a reference character that includes the characters common to each element of the same type is used such as "the information processing apparatuses 101". Further, "i" or "j"

(where, i≠j) may be appended to indicate an arbitrary element of the elements of the same type.

A port 111 of the L2 switch 103 is connected to respective ports 112-1, 112-2 of the information processing apparatuses 101-1, 101-2. In particular, as depicted in FIG. 1, the port 111 and the ports 112-1, 112-2 are connected by a breakout cable 104. The breakout cable 104 includes a connector 121 and connectors 122-1, 122-2. The connector 121 is connected to the port 111; the connector 122-1 is connected to the port 112-1; and the connector 122-2 is connected to the port 112-2.

The monitoring apparatus 102 is an apparatus that monitors the information processing apparatuses 101. The L2 switch 103 is an apparatus that transfers, as data, an Ethernet (registered trademark) frame. Hereinafter, an Ethernet frame is indicated as simply "frame". The transmission apparatus 105 is an apparatus that transmits frames to the information processing apparatuses 101.

Figure 7:
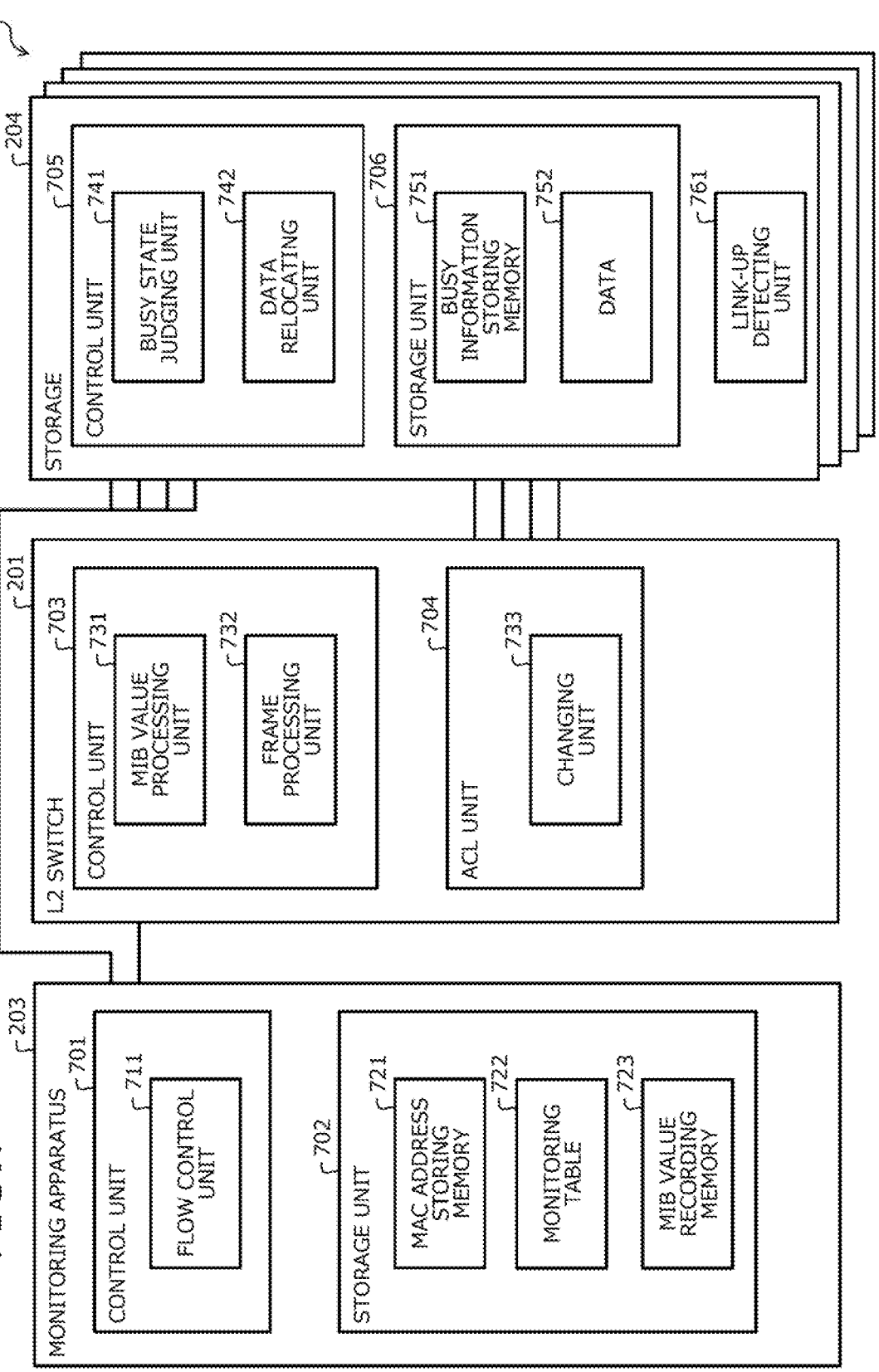
FIG. 7 is a diagram of an example of a functional configuration of the storage system 200.

As depicted by (1) in FIG. 1, each of the information processing apparatuses 101-$i$ judges whether the port 112-$i$ thereof is able to respond to a request, based on a result of comparison of a busy level of the port 112-$i$ and a busy level of the port 112-$j$ of another information processing apparatus 101-$j$. Here, a busy level is a value indicating an extent of delay of a response to a request. For example, a value indicating the extent of delay of a response to a request may be, for example, a period from the transmission of the request until the response, the number of requests retained, or a value obtained by multiplying the described period and the number of requests. A specific busy level calculation method is depicted in FIG. 7. Further, whether the port of each of the information processing apparatuses 101 is capable of responding to a request is denoted hereinafter by "busy flag". A state when the ports 112 of the information processing apparatuses 101 cannot respond to a request is denoted by "busy flag ON" while a state when the ports 112 of the information processing apparatuses 101 can respond to a request is denoted by "busy flag OFF".

For example, each of the information processing apparatuses 101-$i$ judges that busy flag ON when the busy level of the port 112-$i$ thereof is at least 2 times an average of the busy levels of the other information processing apparatuses 101-$j$; and when the busy level of the port 112-$i$ is less than 2 times the average, the information processing apparatus 101-$i$ judges that busy flag OFF. In the example depicted in FIG. 1, the information processing apparatus 101-1 judges that a busy flag of the port 112-1 is OFF and the information processing apparatus 101-2 judges that a busy flag of the port 112-2 is ON.

As depicted by (2) in FIG. 1, the monitoring apparatus 102 acquires from each of the information processing apparatuses 101, a busy flag judgment result obtained by the respective information processing apparatuses 101. In the example depicted in FIG. 1, the monitoring apparatus 102 acquires from the information processing apparatus 101-1, a busy flag judgment result indicating that the busy flag of the port 112-1 is OFF and acquires from the information processing apparatus 101-2, a busy flag judgment result indicating that the busy flag of the port 112-2 is ON.

Next, as depicted by (3) in FIG. 1, the monitoring apparatus 102, based on the acquired judgment results of the information processing apparatuses 101, determines a first information processing apparatus 101 and a second information processing apparatus 101. Here, the first information processing apparatus 101 is an information processing apparatus 101 that of the information processing apparatuses 101, does not transmit a frame. Further, the second information processing apparatus 101 is an information processing apparatus 101 that transmits a frame in place of the first information processing apparatus 101. In particular, the monitoring apparatus 102 determines, as the first information processing apparatus 101, an information processing apparatus 101 whose busy flag is ON and determines, as the second information processing apparatus 101, an information processing apparatuses 101 whose busy flag is OFF. Further, when determining the first information processing apparatus 101 and the second information processing apparatus 101, the monitoring apparatus 102 may determine information capable of uniquely identifying the first information processing apparatus 101 and the second information processing apparatus 101.

In the description hereinafter, as information capable of uniquely identifying the first information processing apparatus 101 and the second information processing apparatus 101, MAC addresses of the information processing apparatuses 101 are used. The information identifying the first information processing apparatus 101 is described as "busy-state MAC address" because the first information processing apparatus 101 is busy and what is to be transmitted is a frame. Further, the information identifying the second information processing apparatus 101 is described as "redirect destination MAC address". In the description of FIG. 1, for the sake of simplicity, reference numerals of the information processing apparatuses 101 are used as the MAC addresses.

In the example depicted in FIG. 1, the monitoring apparatus 102 determines the MAC address of the information processing apparatus 101-2 as the busy-state MAC address and determines the MAC address of the information processing apparatus 101-1 as the redirect destination MAC address.

As depicted by (4) in FIG. 1, the L2 switch 103 acquires information identifying the first information processing apparatus 101 and the second information processing apparatus 101 that have been determined. In the example depicted in FIG. 1, the L2 switch 103 acquires indication that the busy-state MAC address is the MAC address of the information processing apparatus 101-2 and the redirect destination MAC address is the MAC address of the information processing apparatus 101-2. Next, as depicted by (5) in FIG. 1, the L2 switch 103 changes the destination of a frame that is addressed to the first information processing apparatus 101, to the second information processing apparatus 101. Further, the L2 switch 103 changes a transmission source of a frame whose transmission source is the second information processing apparatus 101, to the first information processing apparatus 101. By changing the destination of the frame whose the destination is the first information processing apparatus 101 to the second information processing apparatus 101, a configuration is enabled in which frames are not transmitted to the information processing apparatuses 101 that are in a busy state. Further, a frame whose transmission source is set as the second information processing apparatus 101 is a frame that is a response to the described frame whose destination has been changed. Therefore, changing the transmission source of the frame, for which the second information processing apparatus 101 is set as the transmission source, to the first information processing apparatus 101 enables the transmission apparatus 105 to be caused to recognize the frame as being from the first information processing apparatus 101 that is in the busy state. As a result, the transmission apparatus 105 may correctly judge that the described frame whose transmission source has been changed is a response to the described frame whose destination has been changed.

In the example depicted in FIG. 1, the transmission apparatus 105 is assumed to transmit to the L2 switch 103, a frame Fr1 whose destination is set as the information processing apparatus 101-2. The L2 switch 103 receives the frame Fr1 and since the destination of the frame Fr1 is a busy-state MAC address, the L2 switch 103 changes the destination to the redirect destination MAC address. Further, the information processing apparatus 101-1 is assumed to transmit to the L2 switch 103, a frame Fr2 whose destination is set as the transmission apparatus 105. The L2 switch 103 receives the frame Fr2 and since a transmission destination of the frame Fr2 is the redirect destination MAC address, the L2 switch 103 changes the transmission destination to the busy-state MAC address. As for bold arrows depicted in FIG. 1, a solid bold arrow related to the frame Fr1 indicates a communication path of the frame Fr1 after the destination is changed; a dotted bold arrow related to the frame Fr1 indicates a communication path of the frame Fr1 before the destination is changed. Further, when the transmission apparatus 105 receives the frame Fr2, a solid bold arrow related the frame Fr2 indicates a communication path of the frame Fr2 assumed by the transmission apparatus 105 and a dotted bold arrow related the frame Fr2 indicates an actual communication path of the frame Fr2.

As described, the information processing system 100 does not transmit frames to the information processing apparatuses 101 that are in the busy state. As a result, frames become less likely to be retained in the buffer of the port 111, enabling suppression of an occurrence of system failure of the information processing apparatuses 101 overall. Next, an example of application of the information processing system 100 to a storage system 200 will be described with reference to FIG. 2.

Figure 2:
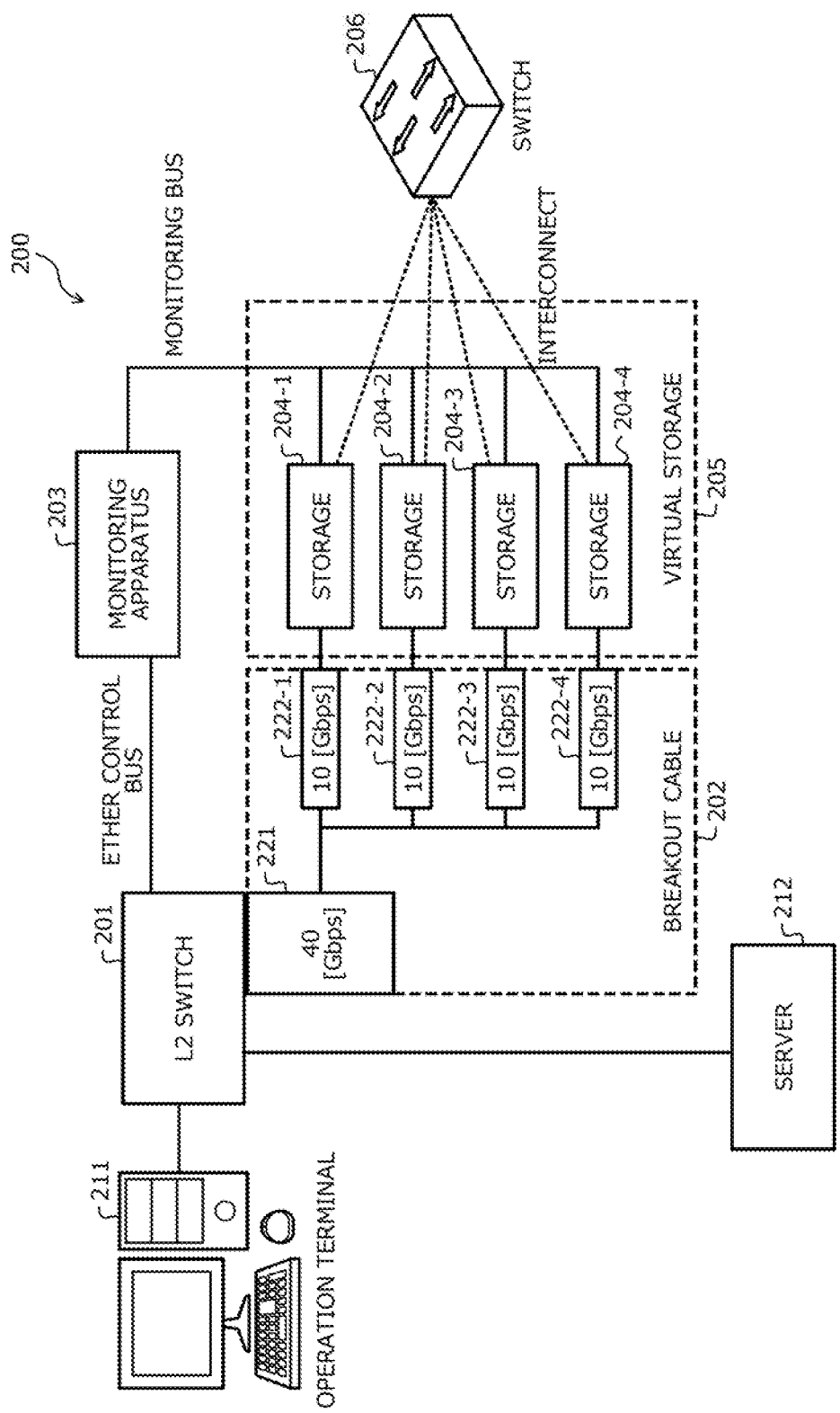
FIG. 2 is a diagram of example of configuration of a storage system 200.

FIG. 2 is a diagram of example of configuration of the storage system 200. The storage system 200 includes an L2 switch 201, a breakout cable 202, a monitoring apparatus 203, storages 204-1 to 204-4, an operation terminal 211, and a server 212. The L2 switch 201 is connected to the operation terminal 211 and the server 212. The L2 switch 201 is further connected to the monitoring apparatus 203 via an Ether control bus. The L2 switch 201 is also connected to the storages 204-1 to 204-4 via the breakout cable 202. The monitoring apparatus 203 is also connected to the storages 204-1 to 204-4 via a monitoring bus. The storages 204-1 to 204-4 are interconnected via a switch 206.

The storages 204 correspond to the information processing apparatuses 101 depicted in FIG. 1. Further, the monitoring apparatus 203 corresponds to the monitoring apparatus 102 depicted in FIG. 1. The L2 switch 201 corresponds to the L2 switch 103 depicted in FIG. 1. The breakout cable 202 corresponds to the breakout cable 104 while the server 212 corresponds to the transmission apparatus 105.

The L2 switch 201 is an apparatus that transfers Ethernet frames. For example, the L2 switch 201 transfers a frame received from the server 212 to any one of the storages 204.

The breakout cable 202 is a cable that connects apparatuses and performs a one-to-many connection. The breakout cable 202 depicted in FIG. 2 is connected to the L2 switch 201 by a 40 [Gbps] connector 221 and is connected to the storages 204-1 to 204-4 by 10 [Gbps] connectors 222-1 to 222-4.

The monitoring apparatus 203 monitors the storages 204-1 to 204-4. The storages 204-1 to 204-4 construct a virtual storage 205. Thus, the server 212 may handle the storages 204-1 to 204-4 as a single storage.

The operation terminal 211 is a terminal operated by a network manager. The server 212 is a server that uses the storages 204. For example, the storages 204 are a Web server or a DB server.

Figure 3:
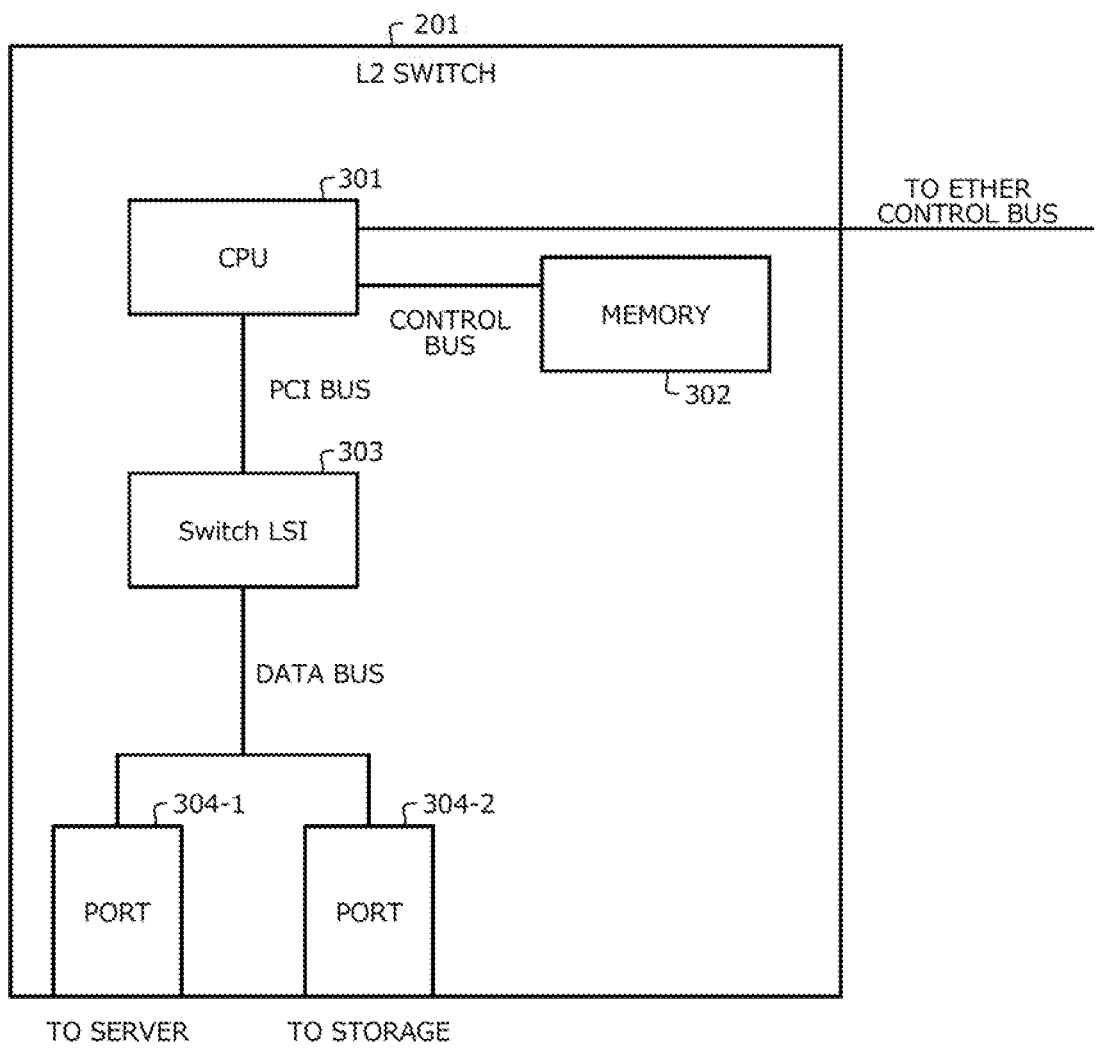
FIG. 3 is a diagram of an example of a hardware configuration of an L2 switch 201.

FIG. 3 is a diagram of an example of a hardware configuration of the L2 switch 201. The L2 switch 201 includes a central processing unit (CPU) 301, a memory 302, a Switch large-scale integration (LSI) 303, and ports 304-1, 304-2.

The CPU 301 is a computation processing apparatus that governs control of the L2 switch 201 overall. The memory 302 is a non-volatile memory storing a program run on the CPU 301, a volatile memory used as a work area of the CPU 301, etc. The Switch LSI 303 is an integrated circuit having a function of an access control list (ACL). The ports 304 perform input and output of data between connected apparatuses. In the example depicted in FIG. 3, the port 304-1 is connected to the server 212; and the port 304-2 is connected to the storages 204 via the breakout cable 202.

Figure 4:
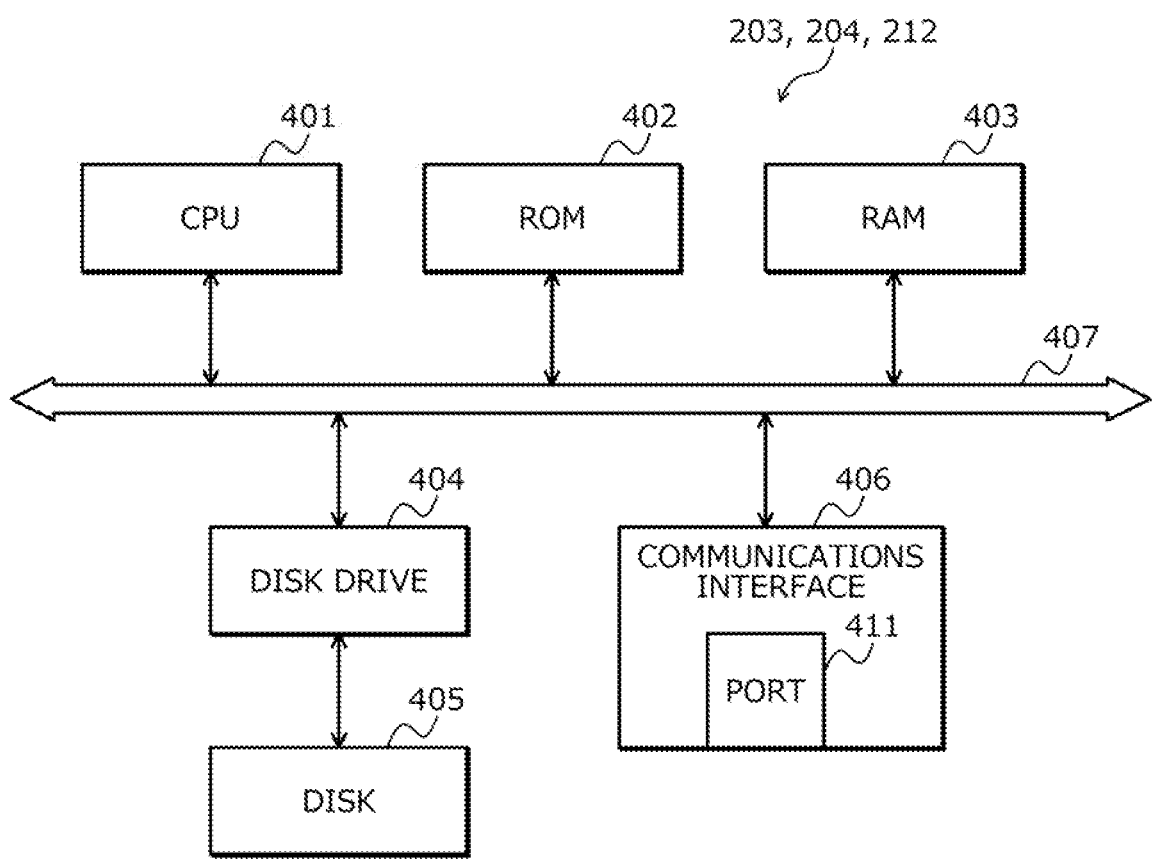
FIG. 4 is a diagram of an example of a hardware configuration of a monitoring apparatus 203, a storage 204, and a server 212.

FIG. 4 is a diagram of an example of a hardware configuration of the monitoring apparatus 203, the storages 204, and the server 212. The monitoring apparatus 203, the storages 204, and the server 212 each have a similar hardware configuration and therefore, in the description hereinafter, the monitoring apparatus 203 will be described while description of the storages 204 and the server 212 is suitably omitted.

In FIG. 4, the monitoring apparatus 203 includes a CPU 401, a read-only memory (ROM) 402, and a random access memory (RAM) 403. The monitoring apparatus 203 further includes a disk drive 404, a disk 405, and a communications interface 406. The CPU 401 to the disk drive 404, and the communications interface 406 are each connected by a bus 407.

The CPU 401 is a computation processing apparatus that governs control of the monitoring apparatus 203 overall. The ROM 402 is a non-volatile memory that stores programs such as a boot program. The RAM 403 is a volatile memory that is used as a work area of the CPU 401.

The disk drive 404 is a control apparatus that, under the control of the CPU 401, controls the reading and writing of data with respect to the disk 405. As the disk drive 404, for example, a magnetic disk drive, an optical disk drive, a solid state drive, etc. may be adopted. The disk 405 is a non-volatile memory that stores data written thereto under the control of the disk drive 404. For example, when the disk drive 404 is a magnetic disk drive, as the disk 405, a magnetic disk may be adopted. Further, when the disk drive 404 is an optical disk drive, as the disk 405, an optical disk may be adopted and when the disk drive 404 is a solid state drive, as the disk 405, a semiconductor memory formed by a semiconductor device, a so-called semiconductor disk may be adopted.

The communications interface 406 is a control apparatus that administers an internal interface with a network and controls a port 411 that performs input and output of data from other apparatuses. In particular, the communications interface 406 is connected to other apparatuses via the network, through a communications line. As the communications interface 406, for example, a modem or a LAN adapter may be adopted. Here, the communications interface 406 of the monitoring apparatus 203 is connected to the L2 switch 201 via the Ether control bus and is connected to each of the storages 204 via the monitoring bus. Here, the ports 411 of the storages 204 are connected to the L2 switch 201 via the breakout cable 202. Therefore, the port 411 corresponds to the port 112 depicted in FIG. 1.

When a manager of the monitoring apparatus 203 directly operates the monitoring apparatus 203, the monitoring apparatus 203 may have hardware such as a display, a keyboard, a mouse, etc.

Figure 5:
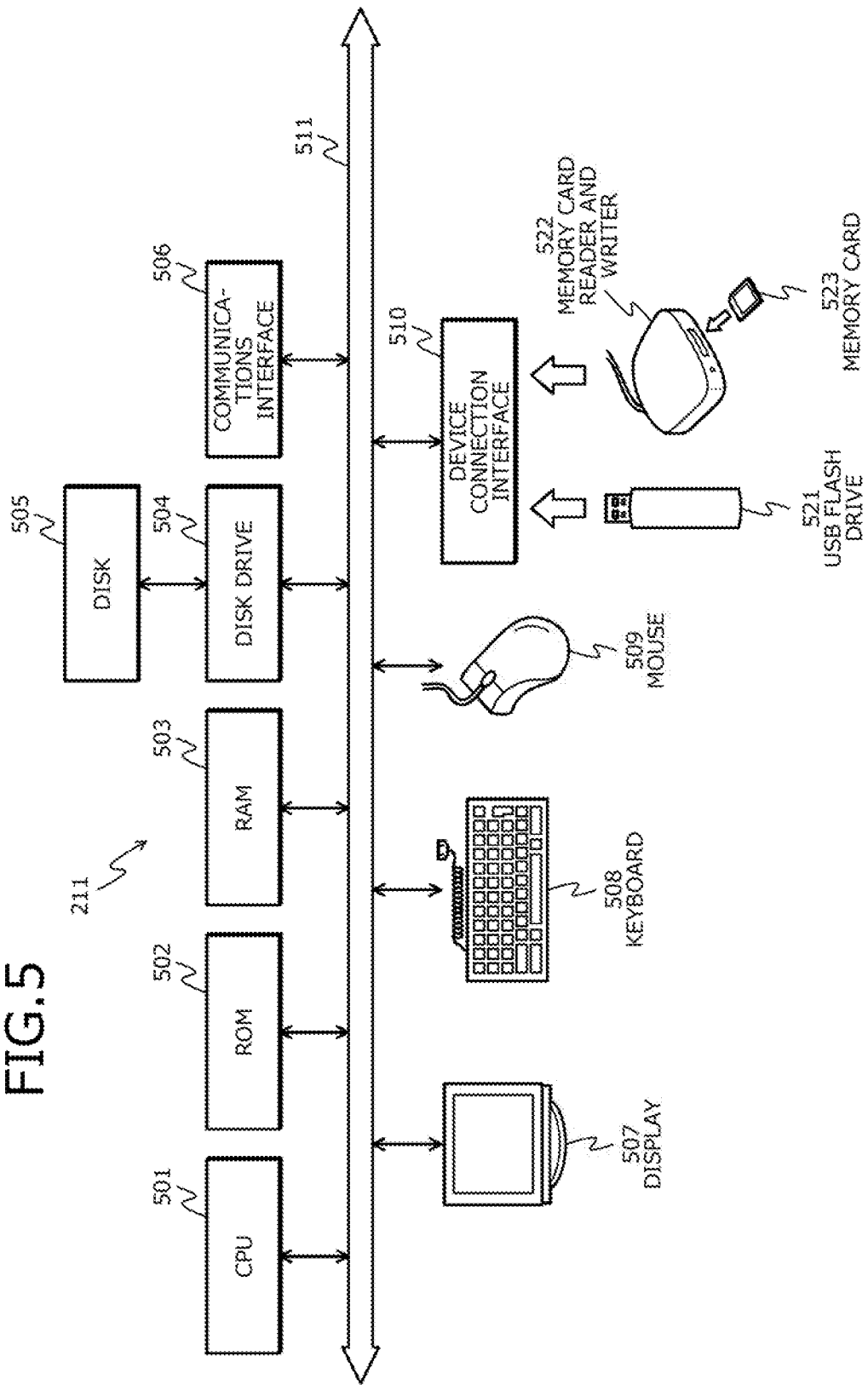
FIG. 5 is a diagram of an example of a hardware configuration of an operation terminal 211.

FIG. 5 is a diagram of an example of a hardware configuration of the operation terminal 211. The operation terminal 211 includes a CPU 501, a ROM 502, a RAM 503, a disk drive 504, a disk 505, and a communications interface 506. The operation terminal 211 further includes a display 507, a keyboard 508, a mouse 509, and a device connection interface 510. The CPU 501 to the disk drive 504 and the communications interface 506 to the device connection interface 510 are each connected by a bus 511.

The CPU 501 is a computation processing apparatus that governs control of the operation terminal 211 overall. The ROM 502 is a non-volatile memory that stores programs such as a boot program. The RAM 503 is a volatile memory that is used as a work area of the CPU 501.

The disk drive 504 is a control apparatus that, under the control of the CPU 501, controls the reading and writing of data with respect to the disk 505. As the disk drive 504, for example, a magnetic disk drive, an optical disk drive, a solid state drive, etc. may be adopted. The disk 505 is a non-volatile memory that stores data written thereto under the control of the disk drive 504. For example, when the disk drive 504 is a magnetic disk drive, as the disk 505, a magnetic disk may be adopted. Further, when the disk drive 504 is an optical disk drive, as the disk 505, an optical disk may be adopted and when the disk drive 504 is a solid state drive, as the disk 505, a semiconductor disk may be adopted.

The communications interface 506 is a control apparatus that administers an internal interface with the network and controls the input and output of data from an external apparatus. In particular, the communications interface 506 is connected to other apparatuses via the network, through a communications line. As the communications interface 506, for example, a modem or a LAN adapter may be adopted.

The display 507 is an apparatus that displays a mouse cursor, icons or toolboxes as well as data such as documents, images, functional information, etc. As the display 507, for example, a cathode ray tube (CRT), a thin film transistor (TFT) liquid crystal display, plasma display, etc. may be adopted.

The keyboard 508 is an apparatus that has keys for inputting text, numerals, various instructions, etc. and performs the input of data. The keyboard 508 may be a touch-panel-type input pad, a numeric key pad, etc. The mouse 509 is a device that moves the mouse cursor, selects a range, moves or changes a size of a window, etc. The mouse 509 may be a device such as a trackball, a joystick, etc. provided the device has a function similar to a pointing device.

The device connection interface 510 is an apparatus that connects the operation terminal 211 and a peripheral device and that performs control of the connected peripheral device. For example, as the device connection interface 510, universal serial bus (USB) or the like may be adopted. Further, when the device connection interface 510 is, for example, a USB, the device connection interface 510 may be connected to a USB flash drive 521 and/or a memory card reader and writer 522.

The USB flash drive 521 is an apparatus that has a built-in flash memory, which is a non-volatile semiconductor memory capable of retaining data without a supply of electricity, and that includes a drive apparatus, which controls the flash memory and communicates with the device connection interface 510. The memory card reader and writer 522 is a control apparatus that controls the reading and writing of data with respect to a memory card 523. The memory card 523 is a card-type recording medium. The memory card 523 has a built-in flash memory.

Figure 6:
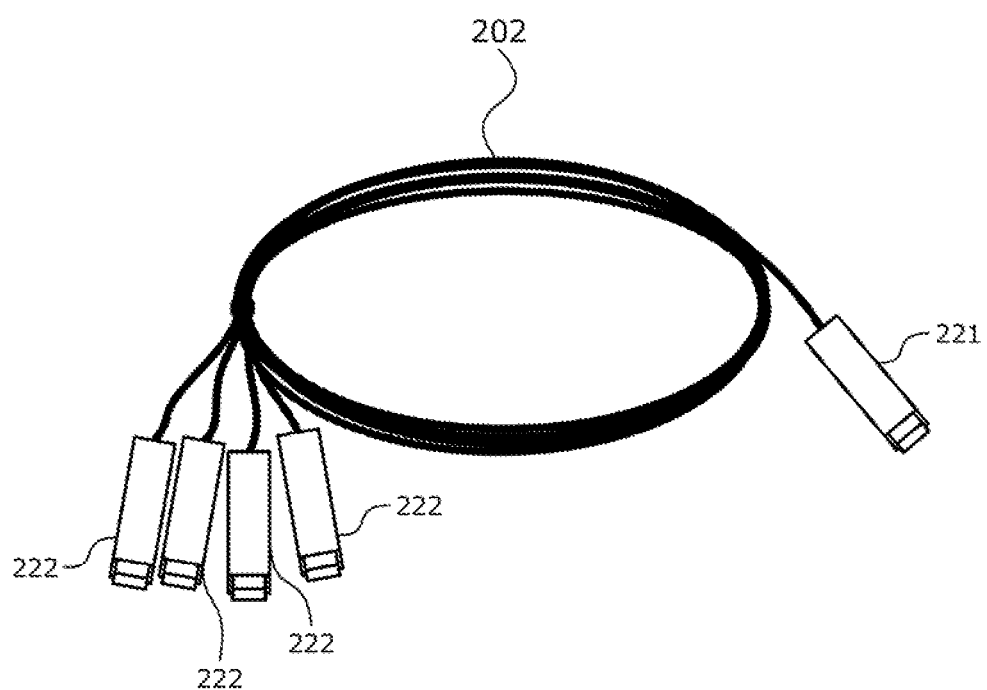
FIG. 6 is a diagram of an example of an external appearance of a breakout cable 202.

FIG. 6 is a diagram of an example of an external appearance of the breakout cable 202. As depicted in FIG. 6, the breakout cable 202 has at one end, the single connector 221 and has at the other end, the connectors 222. An example of a functional configuration of the storage system 200 is depicted in FIG. 7.

FIG. 7 is a diagram of an example of a functional configuration of the storage system 200. The monitoring apparatus 203 has a control unit 701 and a storage unit 702. The L2 switch 201 has a control unit 703 and an ACL unit 704. The storages 204 each have a control unit 705, a storage unit 706, and a link-up detecting unit 761. The control unit 701, the control unit 703, and the control unit 705 realize respective functions thereof by the CPU 401, the CPU 301, and the CPU 401 respectively executing programs stored in storage apparatuses. The storage apparatuses are respectively the RAM 403 and the disk 405 in the case of the control unit 701, the memory 302 in the case of the control unit 703, and the RAM 403 and the disk 405 in the case of the control unit 705. Further, processing results of the control unit 701 are stored to the RAM 403, a register, a cache memory, etc. of the CPU 401. Similarly, processing results of the control unit 703 are stored to the memory 302, a register, a cache memory, etc. of the CPU 301 and processing results of the control unit 705 are stored to the RAM 403, a register, a cache memory, etc. of the CPU 401.

The control unit 701 has a flow control unit 711. The control unit 703 has a management information base (MIB) value processing unit 731 and a frame processing unit 732. The control unit 705 has a busy state judging unit 741 and a data relocating unit 742.

The storage unit 702 is, for example, the RAM 403, the disk 405, etc. The storage unit 702 has a MAC address storing memory 721, a monitoring table 722, and a MIB value recording memory 723. In the MAC address storing memory 721, MAC addresses of the storages 204 are registered. In a storage region of the monitoring table 722, the busy states of the storages 204 are stored. In the MIB value recording memory 723, MIB values are stored. A MIB value has a value of the MAC address of the storage 204 whose busy state is ON and a value of the MAC address that is a redirect destination.

The ACL unit 704 is a function realized by the Switch LSI 303. The ACL unit 704 has a changing unit 733.

The storage unit 706 is, for example, the RAM 403, the disk 405, etc. The storage unit 706 has a busy information storing memory 751 and data 752. In the busy information storing memory 751, the busy levels and busy flags of the storages 204 are stored. The data 752 is data that is shared between the storages 204 by an interconnect. The link-up detecting unit 761 detects with respect to the communications interface 406 thereof, whether a port of the communications interface 406 is linked up. For example, the link-up detecting unit 761 is a function realized by the CPU 401 referring to a control register of the communications interface 406.

Functional units included in the control unit 701, the control unit 703, and the control unit 705 will be described in order of ease of description. The busy state judging unit 741-$i$ of the storage 204-$i$ judges the busy flag of the port 411-$i$, based on a result of comparison of the busy level of the port 411-$i$ and the busy level of the port 411-$j$ of the storage 204-$j$ that is among the storages 204 and different from the storage 204-*i*. Here, the busy level, as depicted in FIG. 1, for example, is a value calculated by multiplying the period from the transmission of a request until a response and the number of retained requests.

For example, at the storage 204-*i*, as the period from the transmission a request until a response, an I/O request WAIT period is assumed to be 38 seconds, and as the number of retained requests, an I/O retaining count is assumed to be 10. In this case, the busy state judging unit 741-*i* calculates the busy level to be 380 [seconds·request]. Further, at the storage 204-*j*, the I/O request WAIT period is assumed to be 5 seconds and as the number of retained requests, the I/O retaining count is assumed to be 1. In this case, the busy state judging unit 741-*j* calculates the busy level thereof to be 5 [seconds·request]. The busy state judging unit 741-*i* of the storage 204-*i* judges that the busy flag is ON for the port 411-*i* because the busy levels for the port 411-*i* and the port 411-*j* of the storage 204-*j* are 380 [seconds·request] and 5 [seconds·request], respectively, and 380×50%>5.

The flow control unit 711 acquires from the storages 204, the judgment results respectively obtained by the storages 204 for the busy flag of the respective ports 411 of the storages 204. The flow control unit 711 determines the busy-state MAC address and the redirect destination MAC address, based on the acquired judgment results of the storages 204.

Further, the flow control unit 711 may acquire from the server 212, classification of requests to the storages 204 and based on the acquired judgment results of the storages 204 and the classification of the requests, the flow control unit 711 may determine the busy-state MAC address and the redirect destination MAC address. For example, it is assumed that among the judgment results of the storages 204 is a judgment result indicating that the busy flag is ON and a classification of a request is a write request. In this case, the flow control unit 711 determines as the busy-state MAC address, the MAC address of the storage 204 that corresponds to the judgment result indicating that the busy flag is ON. Further, the flow control unit 711 determines as the redirect destination MAC address, the MAC address of the storage 204 that corresponds to a judgment result indicating that the busy flag is OFF.

Further, for example, the server 212 may store information indicating a storage 204 that among the storages 204, stores the data 752 that is a target of a read request. In this case, when the judgment results of the storages 204 include a judgment result indicating that the busy flag is ON and the classification of the request is a read request, the flow control unit 711 acquires from the server 212, information identifying the storage 204 that is the read destination. The flow control unit 711 further determines as the busy-state MAC address, the MAC address of the storage 204 that corresponds to the judgment result indicating busy flag ON. The flow control unit 711 determines as the redirect destination MAC address, the MAC address of the storage 204 that corresponds to a judgment result indicating that the busy is flag OFF, and that is the storage 204 that is the read destination.

The flow control unit 711 instructs the storages 204 to relocate the data 752 that is the target of the read request, when there is no storage 204 that is the read destination and that corresponds to a judgment result indicating that the busy flag is OFF. When receiving this relocation instruction, the data relocating unit 742 executes relocation of the data 752. After giving the relocation instruction, the flow control unit 711 determines as the busy-state MAC address, the MAC address of the storage 204 that corresponds to a judgment result indicating that the busy flag is ON. The flow control unit 711 further determines as the redirect destination MAC address, the MAC address of the storage 204 that corresponds to a judgment result indicating that the busy flag is OFF.

The MIB value processing unit 731 acquires from the monitoring apparatus 203, the busy-state MAC address and the redirect destination MAC address determined by the flow control unit 711. The MIB value processing unit 731 sends to the changing unit 733, an instruction to change the destination of a frame whose destination is set to the busy-state MAC address, to the redirect destination MAC address; and to change the transmission source of data whose transmission source is set to the redirect destination MAC address, to the busy-state MAC address.

The changing unit 733, when receiving the frame after receiving the instruction from the MIB value processing unit 731, causes the frame processing unit 732 to analyze SourceMAC address and DestinationMAC address. The changing unit 733, according to the instruction from the MIB value processing unit 731, changes the destination of the frame and the transmission source.

The MAC address storing memory 721 may store correlated with the storages 204, virtual storage identification information that is stored by the storages 204. The virtual storage identification information is information that identifies the virtual storage 205. The virtual storage identification information is denoted hereinafter as "system ID". In this case, the storage 204-*i* stores the system ID thereof. The busy state judging unit 741-*i* judges the busy flag of the port 411-*i* thereof, based on a result of comparison of the busy level of the port 411-*i* and the busy level of the port 411-*j* of the storage 204-*j* that stores a system ID of a value that is identical to that of the system ID stored by the storage 204-*i*. The flow control unit 711-*i* determines and correlates with the system ID, the busy-state MAC address and the redirect destination MAC address, based on the acquired judgment results of the storages 204. Operation of each apparatus of the information processing system 100 will be described with reference to FIGS. 8 to 14.

The operation terminal 211, as a consequence of an operation by the network manager, receives information related to the storages 204 that are to be monitored. The information related to the storages 204 is MAC addresses of the storages 204 and the system ID. The operation terminal 211 transmits the MAC addresses and the system ID to the monitoring apparatus 203. The monitoring apparatus 203 performs frame transfer control among the storages 204 of the same system ID.

The monitoring apparatus 203 monitors the MAC address of each of the storages 204 targeted for monitoring and received from the operation terminal 211. As one monitoring, the monitoring apparatus 203 periodically checks the busy flag corresponding to each of the storages 204 targeted for monitoring. The monitoring apparatus 203 uses the monitoring table 722 and manages the busy state of each of the storages 204 targeted for monitoring. From a combination of the monitoring table 722 and a busy flag, the monitoring apparatus 203 determines a process that is to be performed by the monitoring apparatus 203. Processes of the monitoring apparatus 203, corresponding to combinations of the monitoring table 722 and a busy flag will be described with reference to FIG. 8.

FIG. 8 is a diagram of an example of processes of the monitoring apparatus 203, corresponding to combinations of the monitoring table 722 and a busy flag. A table 800 depicted in FIG. 8, depicts a list of processes of the monitoring apparatus 203, corresponding to combinations of the monitoring table 722 and a busy flag. The table 800 depicted in FIG. 8 has records 801 to 804.

The record 801 indicates that when the busy flag is ON and the busy state in the monitoring table 722 is OFF, the monitoring apparatus 203 transitions to a busy process after changing the busy state to ON. Busy processes will be described with reference to FIG. 9. The record 802 indicates that when the busy flag is ON and the busy state in the monitoring table 722 is ON, the monitoring apparatus 203 transitions to a busy process.

The record 803 indicates that when the busy flag is OFF and the busy state in the monitoring table 722 is OFF, the monitoring apparatus 203 performs no process. The record 804 indicates that when the busy flag is OFF and the busy state in the monitoring table 722 is ON, the monitoring apparatus 203 ends a busy process after changing the busy state to OFF. An example of the busy processes will be described with reference to FIG. 9.

FIG. 9 is a diagram of an example of the busy processes. A table 900 depicted in FIG. 9 indicates contents of the busy processes corresponding to combinations of an access classification and presence/absence of data in the storage 204 not in busy state. The table 900 depicted in FIG. 9 has records 901 to 903.

The record 901 indicates that when the access classification is a read request and the presence of the data in the storage 204 not in busy state is "YES", the monitoring apparatus 203 performs, as a busy process, the frame transfer control using the MIB value. The record 902 indicates a busy process of the monitoring apparatus 203 when the access classification is a read request and the presence of the data in the storage 204 not in busy state is "NO". In this case, as a busy process, the monitoring apparatus 203 instructs the storages 204 to relocate user data and performs the frame transfer control using the MIB value. Here, instructing the storages 204 to relocate the data 752 is instructing the storages 204 whose busy flag is OFF to perform relocation due to data migration that used the interconnect. As a result, it becomes possible to read from another storage 204, the data 752 stored in only the storage 204 whose busy flag is ON.

Figure 10:
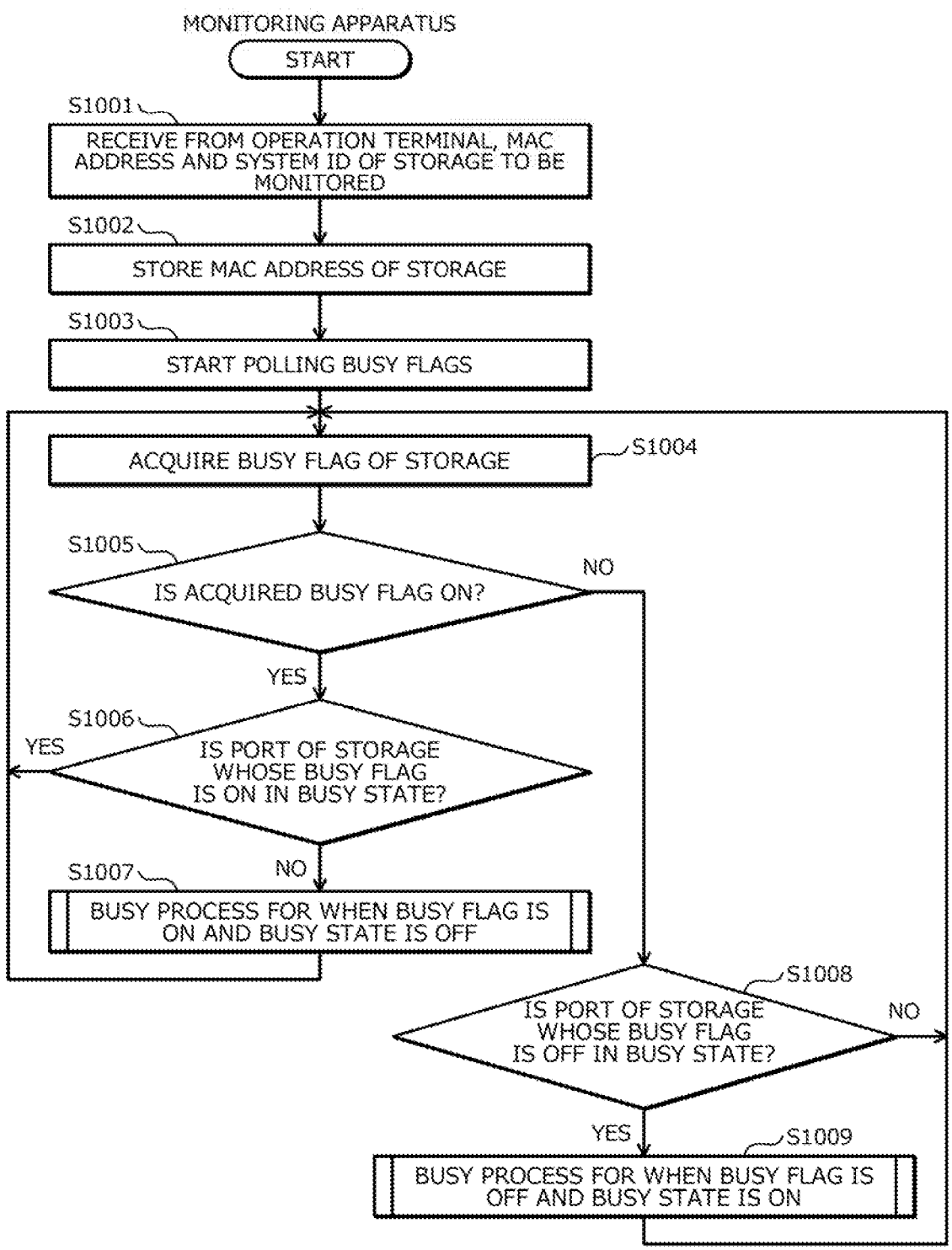
FIG. 10 is a flowchart of an example of a process procedure of the monitoring apparatus 203.
Figure 11:
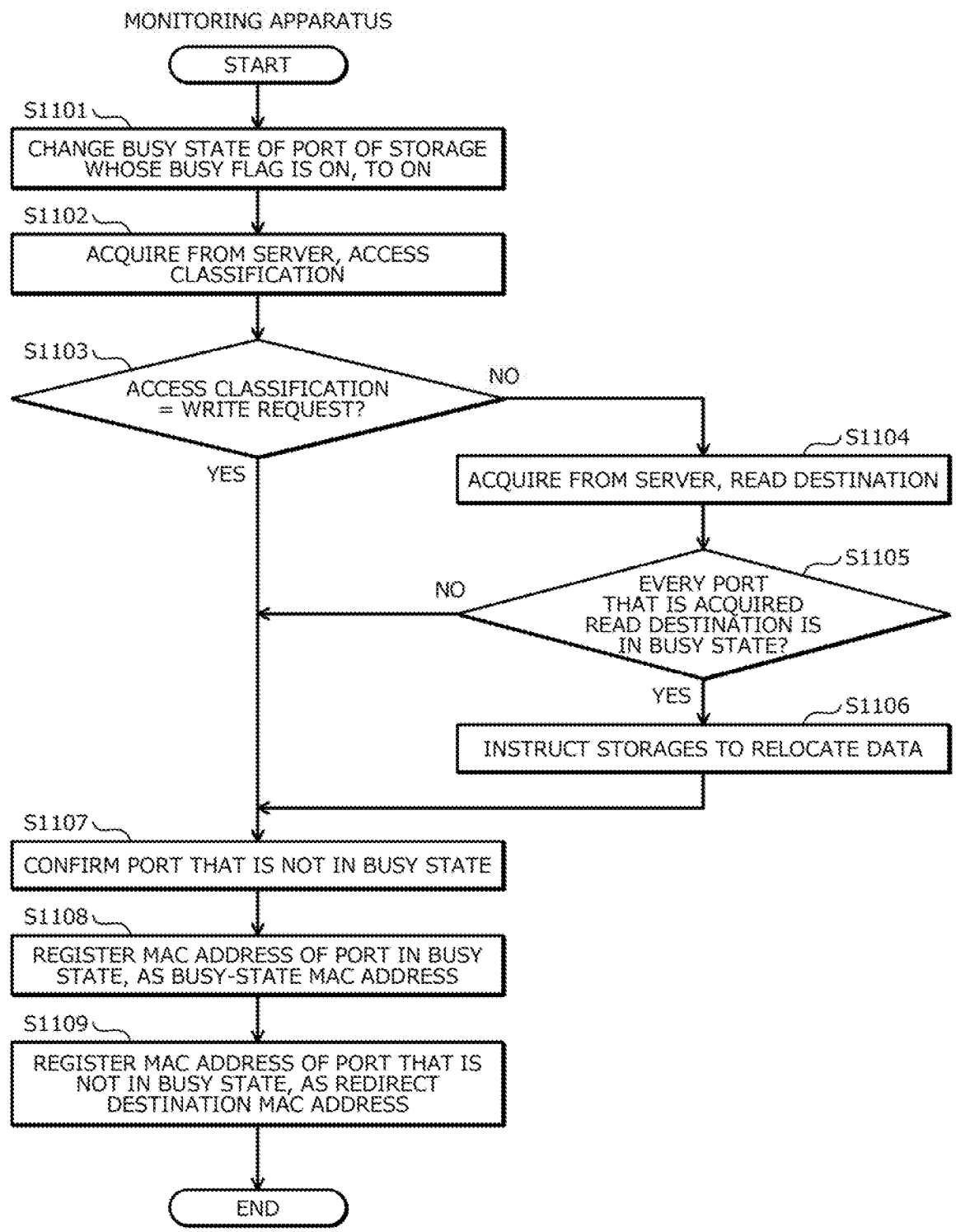
FIG. 11 is a flowchart of an example of a procedure of the busy process for when a busy flag is ON and a busy state is OFF.
Figure 12:
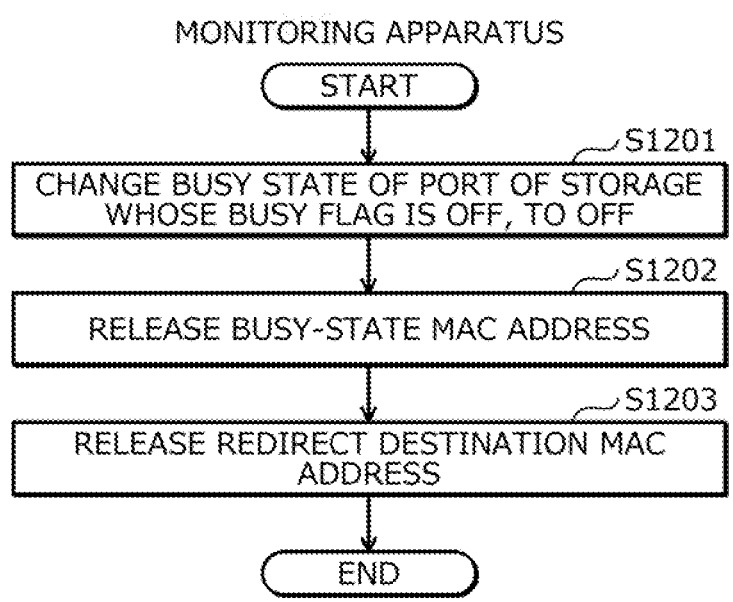

The record 903 indicates that when the access classification is a write request, the monitoring apparatus 203 performs, as a busy process, the frame transfer control using the MIB value. Flowcharts of the processes of the monitoring apparatus 203 are depicted in FIGS. 10 to 12.

The server 212 provides to the monitoring apparatus 203, access details and information related to the locations of data.

Figure 13:
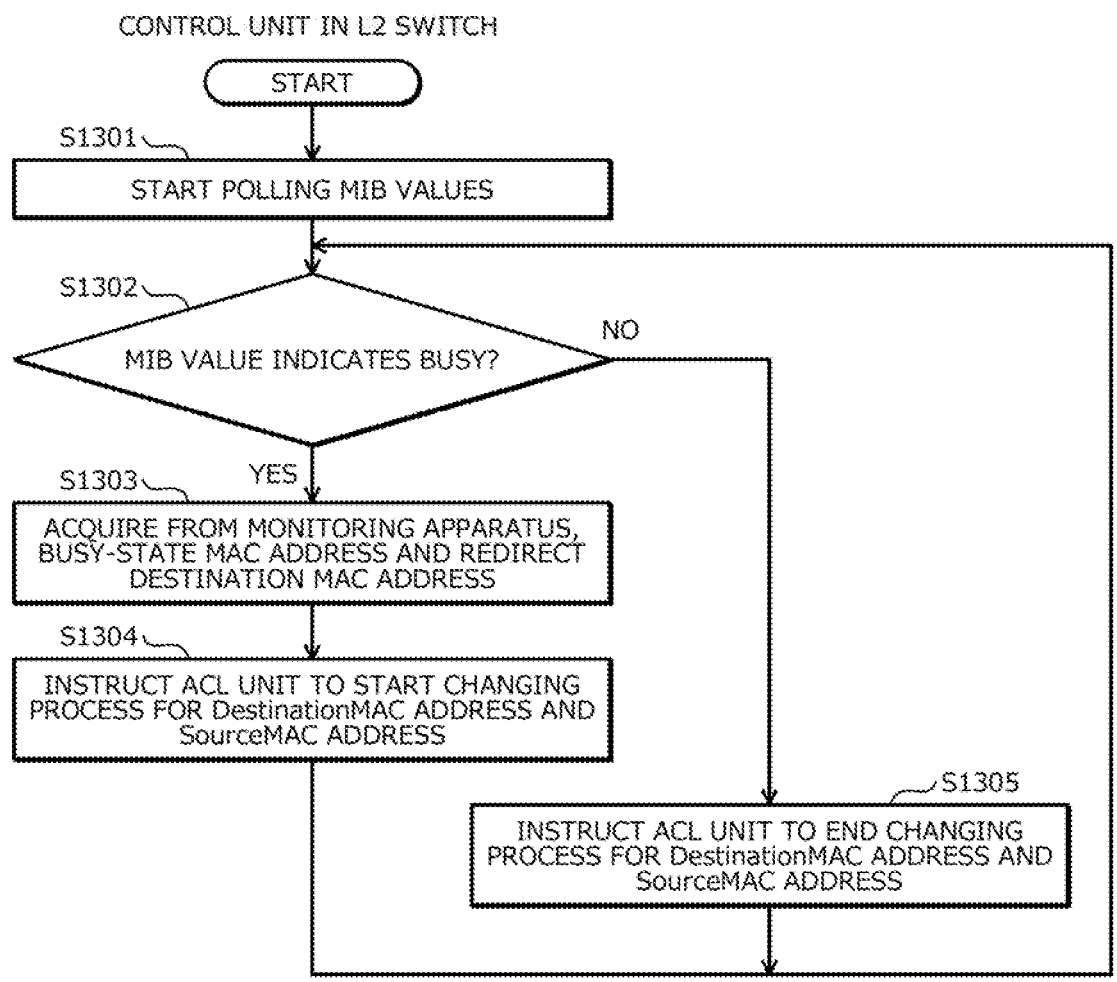
FIG. 13 is a flowchart of an example of a process procedure of a control unit 703 in the L2 switch 201.
Figure 14:
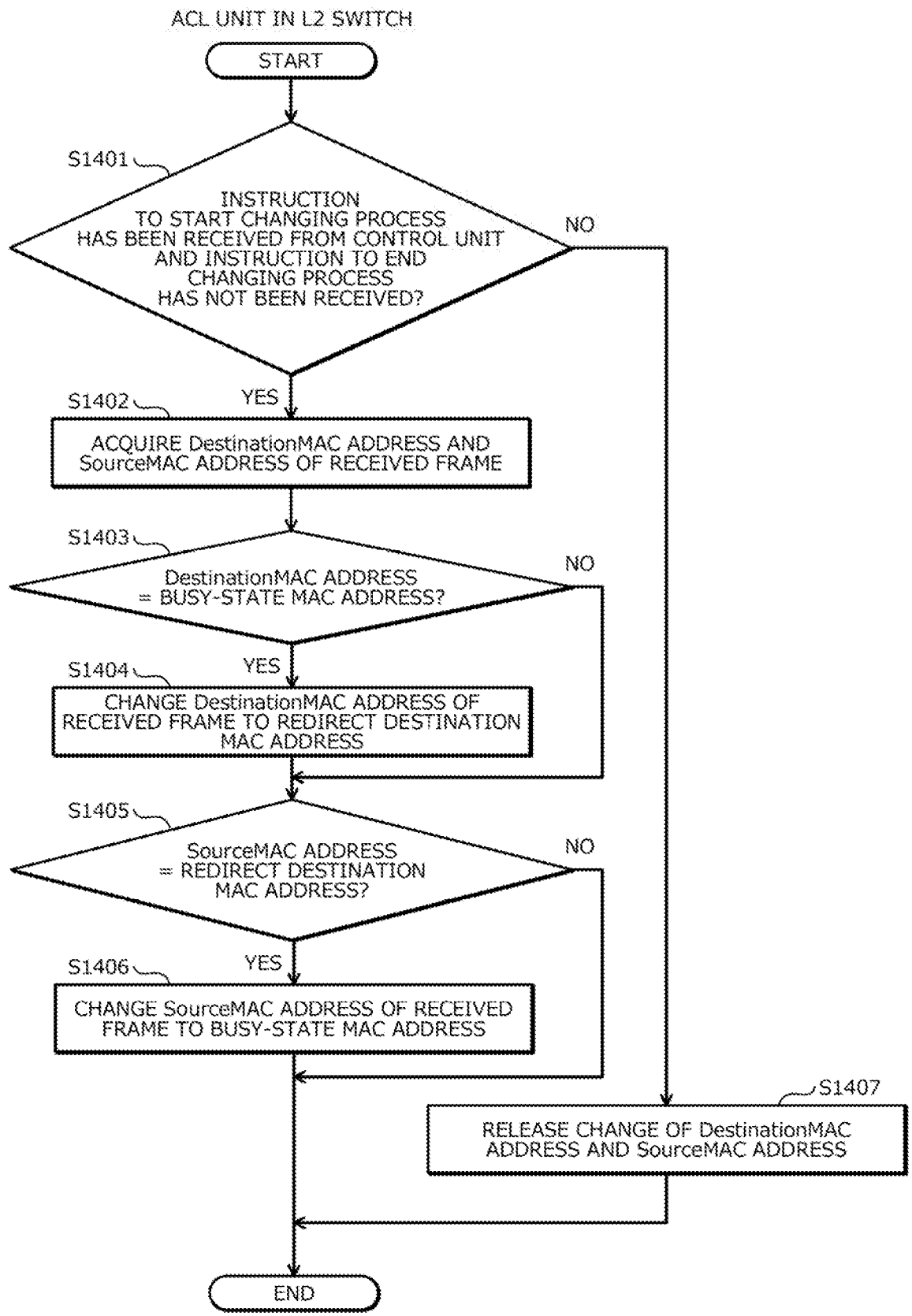
FIG. 14 is a flowchart of an example of a process procedure of an ACL unit 704 in the L2 switch 201.

The L2 switch 201, from the MIB value provided by the monitoring apparatus 203, changes the SourceMAC address and the DestinationMAC address of a frame. When the MIB value, which is polled periodically, indicates busy state ON, the L2 switch 201 acquires from the MIB value, the SourceMAC address and the DestinationMAC address of the frame that is to be changed. The L2 switch 201 performs a changing process for the SourceMAC address and the DestinationMAC address. A frame that is to be changed is a frame whose DestinationMAC address is the busy-state MAC address and frame whose SourceMAC address is the redirect destination MAC address. Further, the L2 switch 201, triggered by a MIB value indicating that the busy state is OFF, ends the changing process for the SourceMAC address and the DestinationMAC address. Flowcharts of the processes of the L2 switch 201 are depicted in FIGS. 13 and 14.

The storages 204, by the system ID provided by the monitoring apparatus 203, perform judgment of whether to perform a process according to the present embodiment. In a case where the provided system ID has already been registered by the storages 204 as a monitoring subject, the storages 204 judge that this shows a single virtual storage 204 constituted by the plural storages 204 and the storages 204 transition to the process according to the present embodiment. In a case where the provided system ID has not been registered by the storages 204 as a monitoring subject, the storages 204 do not perform the process according to the present embodiment.

When transitioning to a process of the present embodiment, the storages 204 acquire the state of the port 411 under monitoring. If the acquire state indicates an off-line state, the storages 204 switch the busy flag to OFF and end the process.

On the other hand, when the port 411 under monitoring is in an on-line state, i.e., is linked up, the storages 204 acquire the I/O request WAIT period and the I/O retaining count, and calculate the busy level from the acquired information. For example, the storage 204-$i$ calculates, as the busy level, a value obtained by multiplying the I/O request WAIT period and the I/O retaining count. The storage 204-$i$ stores the calculated busy level to the busy information storing memory 751-$i$.

Figure 15:
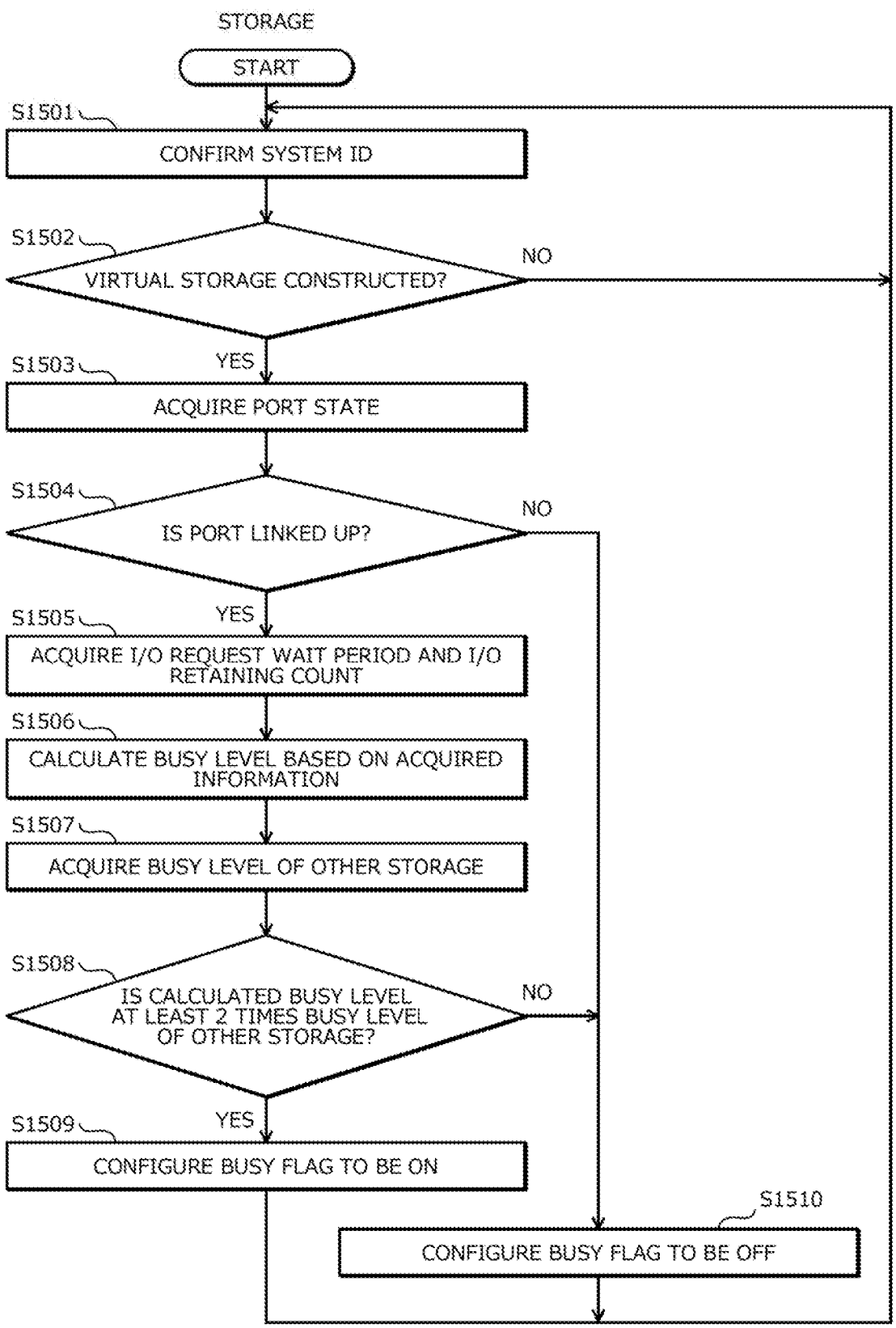
FIG. 15 is a flowchart of an example of a process procedure of the storage 204.

When completing calculation of the busy level, the storage 204-$i$ acquires the busy level from the busy information storing memories 751-$j$ of the storages 204-$j$, which have the same system ID as the storage 204-$i$. The storage 204-$i$ compares the busy level thereof and the acquired busy levels. When the busy level thereof is at least 2 times the average of the storages 204-$j$, the storage 204-$i$ configures the busy flag of the port 411-$i$ under monitoring to ON. On the other hand, when the busy level thereof is less than 2 times the average of the storages 204-$j$, the storage 204-$i$ configures the busy flag of the port 411-$i$ under monitoring to OFF. By the comparison with the storages 204-$j$, the storage system 200 enables operation of the busy flag for only the storage 204 at which exceptional performance degradation is occurring. A flowchart of the process of the storages 204 is depicted in FIG. 15.

The processes of the apparatuses of the information processing system 100 will be described with reference to FIGS. 10 to 15.

FIG. 10 is a flowchart of an example of a process procedure of the monitoring apparatus 203. The monitoring apparatus 203 receives from the operation terminal, the MAC address and the system ID of a storage 204 to be monitored (step S1001). The monitoring apparatus 203 stores to the MAC address storing memory 721, the received MAC address of the storage 204 to be monitored (step S1002). The monitoring apparatus 203 starts polling of the busy flags (step S1003). The monitoring apparatus 203 acquires from the busy information storing memory 751 of the storage 204, the busy flag of the storage 204 (step S1004). The monitoring apparatus 203 judges whether the acquired busy flag is ON (step S1005).

When the acquired busy flag is ON (step S1005: YES), the monitoring apparatus 203 refers to the monitoring table 722 and judges whether the port 411 of the storage 204 whose busy flag is ON is in the busy state (step S1006). When the port 411 of the storage 204 whose busy flag is ON is not in the busy state (step S1006: NO), the monitoring apparatus 203 executes a busy process for when the busy flag is ON and the busy state is OFF (step S1007). The busy process for when the busy flag is ON and the busy state is OFF will be described with reference to FIG. 11. After completion of the process at step S1007 or when the port 411 of the storage 204 whose busy flag is ON is in the busy state (step S1006: YES), the monitoring apparatus 203 transitions to the operation at step S1004.

On the other hand, when the acquired busy flag is OFF (step S1005: NO), the monitoring apparatus 203 judges whether the port 411 of the storage 204 whose busy flag is OFF is in the busy state (step S1008). When the port 411 of the storage 204 whose busy flag is OFF is in the busy state (step S1008: YES), the monitoring apparatus 203 executes a busy process for when the busy flag is OFF and the busy state is ON (step S1009). The busy process for when the busy flag is OFF and the busy state is ON will be described with reference to FIG. 13. After completion of the process at step S1009 or when the port 411 of the storage 204 whose busy flag is OFF is not in the busy state (step S1008: NO), the monitoring apparatus 203 transitions to the operation at step S1004.

FIG. 11 is a flowchart of an example of a procedure of the busy process for when the busy flag is ON and the busy state is OFF. The busy process for when the busy flag is ON and the busy state is OFF corresponds to the process indicated by the record 801.

The monitoring apparatus 203 changes in the monitoring table 722, the busy state of the port 411 of the storage 204 whose busy flag is ON, to ON (step S1101). Next, the monitoring apparatus 203 acquires from the server 212, access classification (step S1102). The monitoring apparatus 203 judges whether the access classification is a write request (step S1103). When the access classification is a read request (step S1103: NO), the monitoring apparatus 203 acquires from the server, a read destination (step S1104). Here, the read destination is information that identifies the storage 204 that is the read destination. Information that identifies the storage 204 is, for example, the MAC address of the port 411 of the storage 204. The monitoring apparatus 203 judges whether every port 411 that is the acquired read destination is in the busy state (step S1105).

When every port 411 that is the acquired read destination is in the busy state (step S1105: YES), the monitoring apparatus 203 instructs the storages 204 to relocate the data 752 (step S1106). The storages 204 that receive the instruction execute relocation of the data 752.

After completion of the operation at step S1106 or when the access classification is a write request (step S1103: YES) or when every port 411 that is the acquired read destination is not in the busy state (step S1105: NO), the monitoring apparatus 203 refers to the monitoring table 722 and confirms the port 411 that is not in the busy state (step S1107). Subsequently, the monitoring apparatus 203 refers to the MAC address storing memory 721 and registers in the MIB value recording memory 723 as the busy-state MAC address, the MAC address of the port 411 that is in the busy state (step S1108). Further, the monitoring apparatus 203 refers to the MAC address storing memory 721 and registers in the MIB value recording memory 723 as the redirect destination MAC address, the MAC address of the port 411 that is not in the busy state (step S1109). After the operation at step S1109, the monitoring apparatus 203 ends the busy process for when the busy flag is ON and the busy state is OFF.

FIG. 12 is a flowchart of example of a procedure of the busy process for when the busy flag is OFF and the busy state is ON. The busy process for when the busy flag is OFF and the busy state is ON corresponds to the process indicated by the record 804.

The monitoring apparatus 203 changes the busy state of the port 411 of the storage 204 whose busy flag is OFF, to OFF (step S1201). Next, the monitoring apparatus 203 refers to the MAC address storing memory 721 and releases the busy-state MAC address registered in the MIB value recording memory 723 (step S1202). Further, the monitoring apparatus 203 refers to the MAC address storing memory 721 and releases the redirect destination MAC address registered in the MIB value recording memory 723 (step S1203). After the operation at step S1203, the monitoring apparatus 203 ends the busy process for when the busy flag is OFF and the busy state is ON.

FIG. 13 is a flowchart of an example of a process procedure of the control unit 703 in the L2 switch 201. The control unit 703 starts polling of the MIB values (step S1301). Subsequently, the control unit 703 refers to the MIB value recording memory 723 of the monitoring apparatus 203 and judges whether the MIB value indicates busy (step S1302). Here, when a storage 204 whose busy state is ON is present, the MIB value has the value of the MAC address of the storage 204 and the value of the MAC address of the redirect destination. Therefore, the MIB value indicating busy indicates a state in which the MAC address of the storage 204 whose busy state is ON is registered.

When the MIB value indicates busy (step S1302: YES), the control unit 703 acquires from the MIB value recording memory 723 of the monitoring apparatus 203, the busy-state MAC address and the redirect destination MAC address (step S1303). Subsequently, the control unit 703 instructs the ACL unit 704 to start the changing process for the DestinationMAC address and the SourceMAC address (step S1304). After completion of the operation at step S1304, the control unit 703 transitions to the operation at step S1302.

On the other hand, when the MIB value does not indicate busy (step S1302: NO), the control unit 703 instructs the ACL unit 704 to end the changing process for the DestinationMAC address and the SourceMAC address (step S1305). After completion of the operation at step S1305, the control unit 703 transitions to the operation at step S1302.

FIG. 14 is a flowchart of an example of a process procedure of the ACL unit 704 in the L2 switch 201. The ACL unit 704 receives from the control unit 703, an instruction to start the changing process and judges whether an instruction to end the changing process has not been received (step S1401). When an instruction to start the changing process has been received and an instruction to end the changing process has not been received (step S1401: YES), the ACL unit 704 analyzes a received frame and thereby, acquires the DestinationMAC address and the SourceMAC address of the received frame (step S1402). Subsequently, the ACL unit 704 judges whether the DestinationMAC address of the received frame is the busy-state MAC address (step S1403). When the DestinationMAC address of the received frame is busy-state MAC address (step S1403: YES), the ACL unit 704 changes the DestinationMAC address of the received frame to the redirect destination MAC address (step S1404).

After completion of the operation at step S1404 or when the DestinationMAC address of the received frame is not the busy-state MAC address (step S1403: NO), the ACL unit 704 judges whether the SourceMAC address is the redirect destination MAC address (step S1405). When the SourceMAC address is the redirect destination MAC address (step S1405: YES), the ACL unit 704 changes the SourceMAC address of the received frame to the busy-state MAC address (step S1406). After completion of the operation at step S1406 or when the SourceMAC address is not the redirect destination MAC address (step S1405: NO), the ACL unit 704 ends the series of operations.

On the other hand, when no instruction to start the changing process has been received or when an instruction to start the changing process has been received and an instruction to end the changing process has been received (step S1401: NO), the ACL unit 704 releases the change of the DestinationMAC address and the SourceMAC address (step S1407). After completion of the operation at step S1407, the ACL unit 704 ends the series of operations.

FIG. 15 is a flowchart of an example of a process procedure of the storages 204. The storage 204-$i$ confirms the system ID (step S1501). The storage 204-$i$ judges by the system ID, whether the storage 204-$i$ is included in the virtual storage 205 constructed (step S1502). When the storage 204-$i$ is not included in the virtual storage 205 constructed (step S1502: NO), the storage 204-$i$ transitions to the operation at step S1501.

On the other hand, when the storage 204-$i$ is included in the virtual storage 205 constructed (step S1502: YES), the storage 204-$i$ acquires the port state (step S1503). The storage 204-$i$ judges from the acquired port state, whether the port 411-$i$ is linked up (step S1504). When the port 411-$i$ is linked up (step S1504: YES), the storage 204-$i$ acquires the I/O request WAIT period and the I/O retaining count (step S1505). The storage 204-$i$ calculates the busy level based on the acquired information (step S1506). The storage 204-$i$ stores the calculated busy level to the busy information storing memory 751-$i$.

Subsequently, the storage 204-$i$ acquires from the busy information storing memory 751-$j$ of the storage 204-$j$, the busy level of the storage 204-$j$ (step S1507). The storage 204-$i$ judges whether the calculated busy level is at least 2 times the busy level of the storage 204-$j$ (step S1508). When the calculated busy level is at least 2 times the busy level of the storage 204-$j$ (step S1508: YES), the storage 204-$i$ configures the busy flag of the busy information storing memory 751-$i$ to be ON (step S1509).

When the port 411-$i$ is not linked up (step S1504: NO) or when the calculated busy level is less than 2 times the busy level of the storage 204-$j$ (step S1508: NO), the storage 204-$i$ configures the busy flag in the busy information storing memory 751-$i$ to be OFF (step S1510). After completion of the process at step S1509 or step S1510, the storage 204-$i$ transitions to the operation at step S1501.

As described, in the storage system 200, the storages 204 judge the busy flags and based on the judgment results of the storages 204, the L2 switch 201 changes the destination of a frame whose destination is the busy-state MAC address, to the destination of the redirect destination MAC address. As a result, frames become less likely to be retained in the port 304-2 of the L2 switch 201 and an occurrence of a system failure of the storages 204 overall may be suppressed. Further, the storage system 200 does not require the judgment of the manager regarding frame transfer control when a problem of the storages 204 occurs and as a result, system failure of the storages 204 overall may be avoided without human mediation. Further, the storage system 200 may realize normal operation of the system of the storages 204 overall even when a problem occurs at a certain one of the storages 204. Further, none of the 8 recovery procedures described in FIG. 1 is necessary, thereby enabling the number of man-hours of the manager to be suppressed.

The monitoring apparatus 203 may determine the busy-state MAC address and the redirect destination MAC address based on the busy flag judgment results obtained by the storages 204 and the classification of a request to the storages 204. In particular, when a storage 204 whose busy flag is ON is present and a request to the storage 204 is a read request, the monitoring apparatus 203 determines as the redirect destination MAC address, the MAC address of a storage 204 whose busy flag is OFF and that stores the data 752 that is the target of the read request. As a result, for a frame that is a read request, the L2 switch 201 transmits the frame to the storage 204 that is not in the busy state and therefore, frames become less likely to be retained in the buffer of the port 304-2 of the L2 switch 201. Further, since the frame is transmitted to the storage 204 that stores the data 752 that is the target of the read request, the server 212 may acquire the data 752 intended.

When a storage 204 whose busy flag is ON is present and a request to the storage 204 is a read request, a storage 204 whose busy flag is OFF and that stores data that is a target of the read request may not be present. In this case, the monitoring apparatus 203 instructs the storages 204 to relocate the data 752. As a result, the monitoring apparatus 203 may obtain a storage 204 whose busy flag is OFF and that stores the data that is the target of the read request.

When a storage 204 whose busy flag is ON is present and a request to the storage 204 is a write request, the monitoring apparatus 203 determines as the busy-state MAC address, the MAC address of the storage 204 whose busy flag is ON and determines as the redirect destination MAC address, the MAC address of a storage 204 whose busy flag is OFF. For the write request, the data 752 is shared between the storages 204 by the interconnect, enabling the write request to be transmitted to any one of the storages 204. For a frame that is a write request, the L2 switch 201 transmits the frame to a storage 204 that is not in the busy state and therefore, frames become less likely to be retained in the buffer of the port 304-2 of the L2 switch 201.

In the storage system 200, a storage 204 that constructs the virtual storage 205 and a storage 204 that does not construct the virtual storage 205 may both be present and the virtual storage 205 may be present in plural. In this case, the storages 204 each judges the busy flag of the port 411 thereof based on a result of comparison of the busy level of the port 411 thereof and the busy level of the port 411 of another storage 204 that stores the system ID of the same value as the system value of the storage 204 making the comparison. The monitoring apparatus 203 determines and correlates with the system ID, the busy-state MAC address and the redirect destination MAC address, based on acquired judgment results of the storages 204. As a result, the storage system 200 may implement the present embodiment even when a storage 204 that constructs the virtual storage 205 and a storage 204 that does not construct the virtual storage 205 are both present, or when the virtual storage 205 is present in plural.

An information processing method described in the present embodiment may be implemented by executing a prepared program on a computer such as a personal computer, a work station, etc. This information processing program is recorded on a non-transitory, computer-readable recording medium such as a hard disk, a flexible disk, Compact Disc-Read Only Memory (CD-ROM), a Digital Versatile Disk (DVD), etc., and is read out from the recording medium and executed by the computer. Further, the information processing program may be distributed through a network such as the Internet.

The L2 switch 201 described in the present embodiment may be realized by an application specific integrated circuit (ASIC) such as a standard cell or a structured ASIC, or a programmable logic device (PLD) such as a field-programmable gate array (FPGA). Specifically, for example, the control unit 703 and the ACL unit 704 of the L2 switch 201 are defined in hardware description language (HDL), which is logically synthesized and applied to an IC, the PLD, etc., thereby enabling manufacture of the L2 switch 201.

According to one aspect, embodiments of the present invention enable a case to be suppressed in which data cannot be transmitted from a single port of a network device when the single port of the network device is connected with the port of plural information processing apparatuses.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a plurality of information processing apparatuses having ports that input and output data;
   a monitoring apparatus connected to each of the plurality of information processing apparatuses; and
   a network device connected to the monitoring apparatus, the network device further connected by a single port, to a port of the each of the plurality of information processing apparatuses, wherein
   the each of the plurality of information processing apparatuses judges based on a result of comparison of a first value indicating an extent of delay of a response to a request at the port of the each of the plurality of information processing apparatuses and a second value obtained from another of the plurality of information processing apparatus and indicating an extent of delay of a response to the request at a port of the other information processing apparatus, whether response to the request is executable by the port of the each of the plurality of information processing apparatuses,
   the monitoring apparatus acquires from the each of the plurality of information processing apparatuses, a result of judgment of whether response to the request is executable by the port of the each of the plurality of information processing apparatuses, and based on the acquired result of judgment by the each of the plurality of information processing apparatuses, determines from the plurality of information processing apparatuses, a first information processing apparatus to which the data is not transmitted and a second information processing apparatus to which the data is transmitted in place of the first information processing apparatus, and
   the network device acquires from the monitoring apparatus, information that identifies the first information processing apparatus and the second information processing apparatus, the network device further changes to the second information processing apparatus, a destination of the data to the first information processing apparatus and changes to the first information processing apparatus, a transmission source of the data from the second information processing apparatus.

2. The information processing system according to claim 1, wherein
   the plurality of information processing apparatuses is a plurality of storages that share the data,
   the information processing system further comprises a transmission apparatus that is connected to the monitoring apparatus and transmits a read request or a write request to the plurality of information processing apparatuses, and
   the monitoring apparatus acquires from the transmission apparatus, a classification of the request to the plurality of information processing apparatuses, and based on the acquired result of judgment by the each of the plurality of information processing apparatuses and the classification of the request, determines the first information processing apparatus and the second information processing apparatus.

3. The information processing system according to claim 2, wherein
   the transmission apparatus stores information that identifies of the plurality of information processing apparatuses, a read-destination information processing apparatus that stores the data that is a target of the read request,
   the monitoring apparatus acquires from the transmission apparatus, the information that identifies the read-destination information processing apparatus, when the classification of the request is the read request and the result of judgment by the each of the plurality of information processing apparatuses includes a result of judgment indicating that response to the request is unexecutable, and
   the monitoring apparatus determines as the first information processing apparatus, an information processing apparatus that corresponds to the result of judgment indicating that response to the request is unexecutable and determines as the second information processing apparatus, an information processing apparatus that is the read-destination information processing apparatus and that corresponds to a result of judgment indicating that response to the request is executable.

4. The information processing system according to claim 3, wherein
   the monitoring apparatus instructs the each of the plurality of information processing apparatuses to relocate the data that is the target of the read request, when the information processing apparatus that is the read-destination information processing apparatus and that corresponds to the result of judgment indicating that response to the request is executable is not present, and
   the monitoring apparatus, after instructing relocation, determines as the first information processing apparatus, the information processing apparatus that corresponds to the result of judgment indicating that response to the request is unexecutable and determines as the second information processing apparatus, the information processing apparatus that corresponds to the result of judgment indicating that response to the request is executable.

5. The information processing system according to claim 2, wherein
   the monitoring apparatus, when the classification of the request is the write request and the result of judgment by the each of the plurality of information processing apparatuses includes a result of judgment indicating that response to the request is unexecutable, determines as the first information processing apparatus, an information processing apparatus that corresponds to the result of judgment indicating that response to the request is unexecutable and determines as the second information processing apparatus, an information processing apparatus that corresponds to a result of judgment indicating that response to the request is executable.

6. The information processing system according to claim 2, wherein
the plurality of information processing apparatuses builds a virtual storage,
the each of the plurality of information processing apparatuses stores virtual storage identification information that identifies the virtual storage, and judges whether response to the request is executable by the port of the each of the plurality of information processing apparatuses, based on the result of comparison of the first value and the second value indicating the extent of delay of a response to the request at the port of the other of the plurality of information processing apparatuses storing the virtual storage identification information of a value identical to that of the virtual storage identification information stored by the each of the plurality of information processing apparatuses, and
the monitoring apparatus stores correlated with the each of the plurality of information processing apparatuses, the virtual storage identification information stored by the each of the plurality of information processing apparatuses, and based on the acquired result of judgment by the each of the plurality of information processing apparatuses, determines from the plurality of information processing apparatuses and correlates with the virtual storage identification information, the first information processing apparatus to which the data is not transmitted and the second information processing apparatus to which the data is transmitted in place of the first information processing apparatus.

* * * * *